Nov. 25, 1941.   E. ATTESLANDER   2,263,605
AIRCRAFT CONSTRUCTION WITH AIRCOOLED ENGINES
Filed Feb. 4, 1941
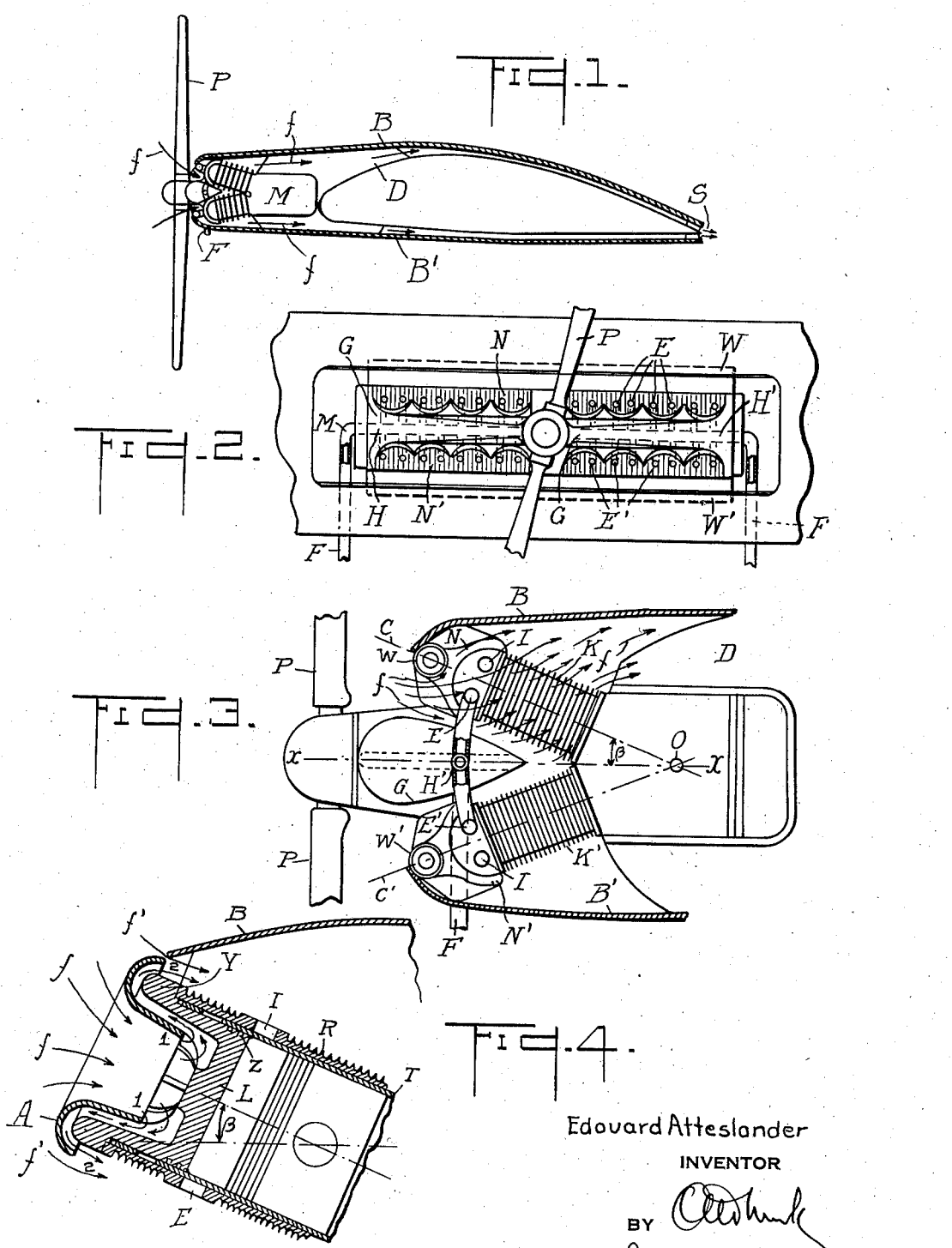
Edouard Atteslander
INVENTOR Patented Nov. 25, 1941

2,263,605

UNITED STATES PATENT OFFICE 2,263,605

AIRCRAFT CONSTRUCTION WITH AIRCOOLED ENGINES

Edouard Atteslander, Winterthur, Switzerland

Application February 4, 1941, Serial No. 377,280
In Great Britain January 26, 1940

6 Claims. (Cl. 123—171)

The present invention relates to aircraft constructions with aircooled engines, and more particularly to air-cooled V-type aircraft engines and to the mounting of such engines within the shell profile of an aircraft element, i. e., of a wing or of the fuselage of an aeroplane.

One object of the invention is to arrange a suitably constructed V-type engine within the shell profile of an aircraft element in such a manner that the exhaust ports of all the cylinders are exposed directly to a blast of cooling air produced by the propeller which is driven by said engine.

A further object of the invention is to arrange a V-type engine wholly within the shell profile of an aircraft element with the crankshaft of the engine extending parallel to and spaced from the leading edge of the shell profile and the cylinders extending to the skin of the shell adjacent said leading edge.

Another object of the invention is to design a construction in which a V-type engine is mounted in a supporting shell profile provided with apertures in its front edge only, the hot exhaust port of each cylinder being disposed on the side thereof facing away from the skin of the shell.

Still another object of the invention is to provide means whereby the airstream coming from the propeller is guided directly to the hottest portions of the engine cylinders.

A still further object of the invention is to construct a powerful engine of relatively small height which can be easily mounted within the shell profile of an aeroplane wing.

These and other objects, which will appear more clearly as the specification proceeds, are accomplished according to the present invention, by the arrangement and combination of elements set forth in the following detailed description, defined in the appended claims and illustratively exemplified in the accompanying drawing, in which Fig. 1 is a diagrammatic substantially sectional view of an aeroplane wing combined with an engine according to the invention, the engine being shown in end elevation.

Fig. 2 is a partial elevational front view of the combination shown in Fig. 1.

Fig. 3 is a diagrammatic elevational end view on a larger scale of an engine according to the invention, as mounted in the front part of the shell profile of an aeroplane wing shown in section.

Fig. 4 is a section through a cylinder of a slide valve engine according to the invention and through part of the aeroplane wing in which said engine is mounted.

Referring now to the figures and first to Fig. 1, B and B' denote portions of the skin or covering of an aircraft wing. D is the engine supporting bracket which is formed, for instance, from the ribs of the wing. X—X is the middle axis of the V formed by the axes OC and OC' of the cylinders. The half angle $\beta$ may vary between about 23° and about 15°. The fuel admission ports I and I' are provided on the sides of the cylinders facing the skin portions B and B', respectively, while the exhaust ports E, E' are disposed on the opposite, inner sides of the cylinders. Owing to this arrangement, the skin portions B, B' are nowhere near the exhaust ports E, E' and they need not be apertured for the passage of numerous hot exhaust pipes so that the aerodynamic shape of the shell can be fully preserved and any danger of the skin being burnt is completely avoided. An air stream is produced by the propeller blades P, P, and the cylinder heads are provided with cooling ribs N, N' disposed in the direction of the flow of the cooling air, as indicated by the arrows $f$. An outlet S for the cooling air is provided at the trailing edge of the wing (see Fig. 1). The front edges of the skin portions B, B' rest against the casings of the cam shafts W, W'. These cam shaft casings are disposed above the cylinder heads in such a manner that the major part of the cooling air is passed over the exhaust valves E, E'. The cylinders are first reached by the cooling air on the inside of the V, i. e. on the side of each cylinder where the exhaust ports are disposed. The cylinder portions K, K' on the outside of the V, which are precooled internally by the fuel mixture, are not reached by the cooling air until later, as shown by the arrows $f$. A profiled body G is arranged on the middle axis X—X of the V within the latter and serves to distribute cooling air to the individual cylinders in a direction substantially at right angles to the crankshaft. Exhaust manifolds H, H', enclosed in a heat insulating shell M pass through the body G parallel to the leading edge of the wing and open into downwardly extending exhaust pipes F, F'.

In Fig. 4, the skin B of the wing terminates short of the cylinder-head in the neighbourhood of the coolest portion thereof. T is the slide sleeve, R the cylinder with its ribs and L the cylinder head, which is provided with an upstanding circumferential flange $y$. The fuel mixture is admitted through the port I and the exhaust gases are discharged through the port E disposed on the inside of the V. Z are the sealing rings of the cylinder head L. $\beta$ is the half-angle of the V, as in Fig. 1. A is a funnel shaped cooling nozzle for the cylinder head L. This nozzle projects with its mouth into the space surrounded by the flange Y and has its outer peripheral rim bent around and spaced from the outer edge of said flange so that the air currents $f$ which strike the cylinder head L produce, in the space $l$, an increased pressure, whereas the peripheral air currents $f'$ reduce the pressure at 2. As a result a rapid flow of air takes place along the ribs over the surfaces of the cylinder head L, as indicated by the arrows.

I claim:

1. In an aeroplane the combination of an aircraft element formed as a shell, a V-type air-cooled engine disposed within said shell with the axis of its crankshaft extending parallel to the leading edge of the shell and spaced therefrom towards the centre of the shell profile, said engine having its cylinders extending substantially to the skin of said shell adjacent said leading edge, each of said cylinders having its fuel inlet ports facing the skin of the shell and its exhaust ports disposed within the V, said shell having a cooling air intake opening provided in its leading edge in front of said engine and a cooling air outlet opening provided rearwardly of the rear end of said engine, and an exhaust manifold extending within the V parallel to said leading edge of said shell and rearwardly of said cooling air intake opening.

2. An arrangement, as claimed in claim 1 in which a profiled body is arranged within the V of the engine to distribute cooling air to the individual cylinders in the direction substantially at right angles to the crank shaft.

3. An arrangement, as claimed in claim 1 in which a profiled body is arranged within the V of the engine to distribute cooling air to the individual cylinders, and said exhaust manifold is formed as a heat insulated pipe passing through said body.

4. An arrangement, as claimed in claim 1, in which the cylinder heads are provided with cooling ribs extending in the direction of the air stream.

5. An arrangement, as claimed in claim 1, in which the engine is valve controlled, and camshaft-casings are disposed above the cylinder-heads so as to direct the major part of the cooling air towards the exhaust ports.

6. An arrangement as claimed in claim 1, in which the engine is slide valve controlled and each cylinder head has an upstanding circumferential flange, said arrangement including a funnel-shaped nozzle on each cylinder head, each nozzle projecting with its mouth into the space surrounded by the corresponding circumferential flange and having its outer peripheral rim bent around and spaced from the outer edge of said flange, whereby the air pressure is increased at the centre and decreased at the periphery of each cylinder head and a current of cooling air flows over the surfaces of the cylinder head.

EDOUARD ATTESLANDER.